Nov. 30, 1965     A. P. FRONTCZAK     3,220,540
PAN CONVEYOR VIBRATOR
Filed June 1, 1964
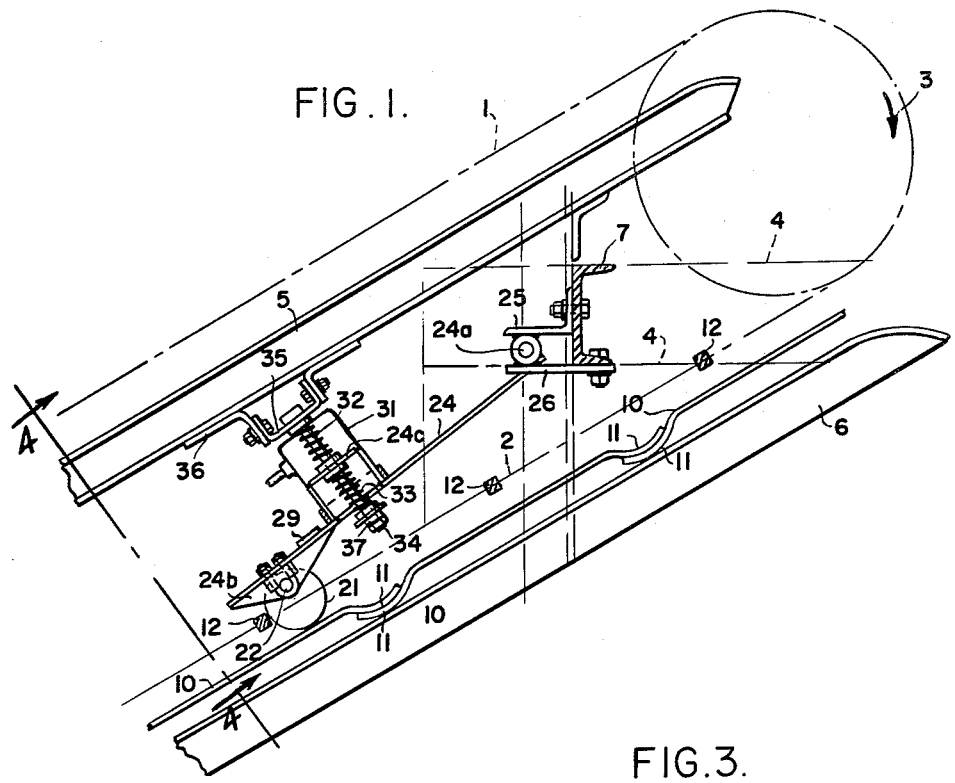
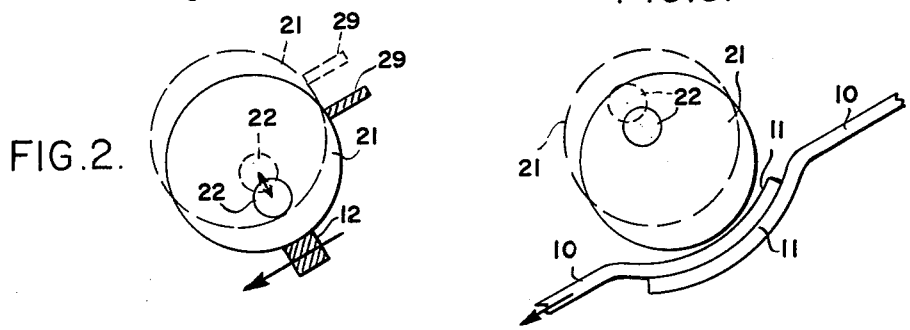
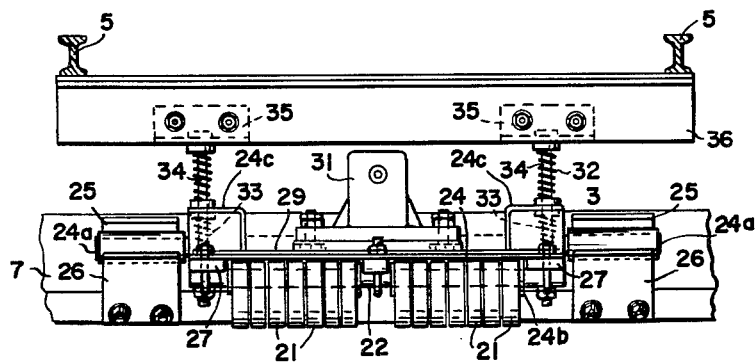

United States Patent Office 3,220,540
Patented Nov. 30, 1965

3,220,540
PAN CONVEYOR VIBRATOR
Aloysious P. Frontczak, Caledonia, Wis., assignor to Rex Chainbelt Inc., Milwaukee, Wis., a corporation of Wisconsin
Filed June 1, 1964, Ser. No. 371,723
6 Claims. (Cl. 198—229)

This invention relates to pan conveyors of the type shown in FIGS. 1–3 of expired United States Patent No. 1,824,756 and particularly to vibrating means for dislodging the material sticking to the inverted pans.

The type of conveyor referred to comprises an endless series of overlapping flat plates or pans supported directly on parallel chains operating over sprockets at the ends of the conveyor. The overlapping margins of the pans at each chain joint are curved about the axis of the joint to maintain a uniformly minimum opening therebetween. The upper conveying run and the inverted lower return run of the conveyor are supported on rails by rollers journalled on the ends of rods extending across the undersides of the pans. Overlapping vertical plates may be fixed to the ends of the pans to form the sides of the conveyor and retain the material being conveyed.

As the chains move around the sprockets at the head or discharge end of the conveyor, the pans are tilted downwardly to discharge the material into the receiving chute.

Most of the material is thus discharged. However, the remaining material dropping from the inverted pans along the return run presents "housekeeping" problems which could be avoided by shaking or vibrating the inverted pans while they are still over the discharge chute.

However, the construction of the pan conveyor, as described, does not permit the use of simple vibrating devices or arrangements such as for shaking bins or boxcars.

In particular, the vibrating device must fit within the relatively small vertical dimensions available between the upper and lower runs and as near the discharge ends of the conveyor as possible, it must be operative over substantially the entire width of the conveyor or of the pans, the vibrating device must be self-adjusting respecting irregularities in the undersides of the pans, the device must rise automatically to allow the rods for the rollers to pass beneath the device and preferably the device should not engage the arcuate overlapping edges of the pans.

The object of the invention is to provide such a device which will effect immediate removal of substantially all of the material sticking to the inverted pans so that such material falls into the discharge chute.

According to the present invention, a series of discs or rappers are freely turnable on a horizontal actuating shaft vibrating in a direction normal to the shaft and the bottom of the inverted pans. The rappers are eccentrically mounted on the shaft and the stroke and frequency of the actuating shaft is such that only the pan bottoms are struck and other parts of the conveyor such as the rods described pass beneath the rappers without difficulty.

The drawings furnished herewith illustrate the best mode of carrying out the invention as presently contemplated and set forth hereinafter.

In the drawings:

FIGURE 1 is a side elevation of a part of the structural framework including the rails supporting the discharge end of the pan conveyor. The pitch line of the chains and sprocket are shown in broken lines. The vibrating device and the pans passing beneath the device are shown in side elevation. The rods extending across the pans are shown in section;

FIG. 2 is an enlarged end view of the cams and a rod shown in section which is moving toward the cams. The fully raised position of the cams allowing the rod to pass beneath the device is shown in broken lines. The plate limiting the upward positioning of the cams is shown in section;

FIG. 3 is a view similar to FIG. 2 showing in solid and broken lines the extreme positions of the stroke of the cams when the overlapping marginal edges of adjacent pans are beneath the device; and, FIG. 4 is a section taken on line 4—4 of FIGURE 1 showing the series of cams and vibrating means in front elevation.

The broken lines 1 and 2 in FIGURE 1 represent the upper and lower runs of the spaced, parallel chains of the conveyor operating over head sprockets represented by the broken-line circle 3.

The broken lines 4 show part of the structure supporting the conveyor. The upper carrying track 5 and return track 6, comprising spaced, parallel rails are supported in a fixed position by the channel 7 shown in section in FIGURE 1 and in elevation in FIG. 4.

The pans 10 shown in FIGURE 1 are inverted after discharge and passing around the head sprockets represented by the circle 3 and the overlapping margins 11 of pans 10 are arcuate as shown for relative movement about the corresponding axes of the joints of the chain, not shown. The rollers, not shown, operating on tracks 5 and 6 are journalled on the ends of the rods 12 which extend through the links of the chains, not shown.

The discharge chute, not shown, is preferably extended to beneath the pan 10 passing beneath the series of metal discs or rappers 21 mounted on the shaft 22. Shaft 22 is supported by the rectangular plate 24 angularly disposed between upper and lower rails 5 and 6.

The upper margin of plate 24 which is located as near to the discharge end of the conveyor as possible, is pivotally supported by means of the shaft 24a which is welded to the plate and is turnable in the brackets 25 and 26 bolted to channel 7. The shaft 22 is spaced beneath the lower margin of plate 24 as by end blocks 27 and the center block 28 and is suitably secured as by the U-bolts shown extending around the shaft and upwardly through plate 24. Shaft 22 is parallel to shaft 24a and the lower margin of plate 24 is indented between blocks 27 and 28 to allow rappers 21 to rotate on shaft 22 to the extent allowed the bar 29 fixed to and across plate 24.

Shaft 22 extends through the flanges 24b extending downwardly from plate 24 to reinforce the plate which is vibrated by a suitable motor, such as the air-operated motor 31 bolted to the top side of plate 22 near the center of the plate.

A portion of plate 24 is offset as at 24c at each side of the plate to allow the use of springs 32 and 33 of adequate and equal length within the space allowed. Each offset 24c, as shown, is of welded construction with additional metal pieces joining each offset 24c with the plate 24. Springs 32 and 33 operate to support the entire vibratory system including plate 24 at its equilibrium position and each set of springs 32 and 33 are retained between the upper and lower ends of a bolt 34.

The upper end of each bolt 34 is carried by the bracket 35 fixed between cross-members 36 and the threaded lower end of the bolt is fitted with a nut 37 which allows springs 32 and 33 to be variably compressed axially. Such adjustment moves plate 24 to position shaft 22 and rappers 21 nearer or farther away from pans 10 and is accomplished by turning nuts 37 on bolts 34. In compressing springs 32 and 33 to move rappers 21 away from pans 10, the frequency of the vibration of the plate, as effected by motor 31, is raised slightly and conversely, if the rappers are not striking the pans with sufficient force because their position is not near enough to the pans, nuts 37 may be turned to lower their position. In turning nuts 37 to lower the pans, the springs are also less compressed and the frequency of the vibration is slightly lowered. The adjustment thus allows the frequency of the vibratory system to be set to match the frequency of motor 31 at its maximum output.

In operation, rappers 21 generally depend from shaft 22 in a position at or near that shown in FIG. 3, which shows the normal stroke of the rappers so that the rappers do not entirely reach the overlapping margins 11 of pans 10. However, it should be understood that the movement of pans 10 keeps the several rappers 21 in various positions clockwise of that shown in FIG. 3 so that, for example, a severe dent in a pan (projecting upwardly) turns those rappers striking the dent slightly further than the other rappers. Accordingly, the striking force of the entire series of rappers is continued without variation and with a uniform striking force.

The required striking force is generally dependent upon how much of the sticking material can be freed from the pans but should not be any more than required generally because the operation of the conveyor is generally continuous and there are near-by operating personnel.

The series of rappers 21 should reach substantially across the underside of the pans 10 for maximum effectiveness. Such effectiveness is partially also made necessary by the fact that the rappers cannot reach the area adjacent to rods 12.

According to the present invention, the rappers 21 continue to operate until the moment they are actually in contact with the rod which is about to pass beneath the rappers. Immediately thereupon, the rappers are, in effect, lifted from their striking position by the rod by turning on shaft 22. By such turning, rappers 21 are then positioned where they are offset from the plane in which shaft 22 is vibrating and are oscillated by shaft vibration so that they do not vibrate rod 12.

When the conveyor is operating at high speeds, each rod 12, in moving against rappers 21, swings the rappers on shaft 22 toward the position shown in FIG. 2 so that the rappers strike bar 29 with some force and immediately reutrn to a lower position. In the time required for such return toward the position of FIG. 3, the rod 12 is generally clear of the rappers which then immediately re-engage the pan to continue the vibratory cleaning action.

A particularly important feature of the present invention resides in the fact that the individual rappers 21 need to strike the pans with a force which is greatly less than the force with which a single rapper must strike the pans to effect the same degree of cleaning. No evidence has been found that such force which is required by the vibrating means of the present invention involves any additional service or maintenance of the conveyor. Two particularly important considerations in this regard are the facts that the vibrations do not accelerate any measurable loosening of the bolted parts of the conveyor and the beating of the pans by the rappers does not deform the pans so that their replacement or reworking is required.

The type of conveyor shown and described operates at speeds generally between fifteen and sixty feet per minute and depending upon the spacing of the rods, they may pass beneath the rappers at the rate of two per second without reducing the effectiveness of their cleaning action.

In the particular embodiment of the invention shown and described the rappers comprise a series of solid metal discs of about four inches in diameter and shaft 22 has a frequency of fifteen to thirty vibrations per second with a stroke of about one-half inch.

Various embodiments of the invention may be employed within the scope of the following claims.

I claim:

1. In combination with a conveyor comprising a continuous series of overlapping pans and supporting means moving and inverting successive pans over a discharge location, said supporting means including a series of rods spaced above the inverted pans; a system for vibrating said moving pans comprising an actuating shaft spaced above and extending across said pans over said locations, power means connected to said shaft to vibrate the entire shaft in a plane normal to the surface of the pans, and a series of discs having eccentrically located holes larger than said shaft, said shaft extending through said holes and said power means providing said actuating shaft with a stroke of a length and frequency respecting the pans so that the discs strike the pans to free the same of material sticking thereto, said discs being pivotally carried by said shaft and normally depending therefrom and pivotally movable by said rods to an offset position respecting the shaft to allow the rods to pass beneath the discs and such that while the discs are in said offset position the vibration of the shaft effects principally a pivotal motion of the discs having no forceful effect upon the rods.

2. In combination with a conveyor comprising a series of pans having generally flat undersides and supporting means moving successive pans over a discharge location, said means including a rod extending across the underside of each pan so as to be immediately over each pan in the inverted position; a plurality of rappers comprising round metal discs having eccentrically located holes, a shaft extending loosely through the holes of said rappers to support the same in a series, power-driven vibratory means connected to said shaft to vibrate the same in a plane normal to the underside of said inverted pans, said rappers normally depending from said shaft and being supported by said shaft to strike the pans, said rappers rotatably supported on said shaft and their said support being such that each rod in passing beneath the shaft swings the rappers to a position laterally offset from said shaft in which offset position the vibratory motion of the shaft is ineffective to cause the rappers to strike the rod in that the rappers are oscillated generally about their centers until the rod has passed beneath the shaft and allowed the rappers to return to gravity to their depending position.

3. The invention of claim 2 wherein each pan includes an arcuate margin overlying a similar margin of the following pan and the free stroke and dimensions of the rappers are such that the rappers do not strike the more indented portion of said margin of any pan.

4. Vibratory means for freeing of sticking material the inverted pans of a conveyor as they pass over a given location, which conveyor includes a stationary framework and a series of rods for the support of the pans, said rods extending across the undersides of the pans and moving therewith, said means comprising a vibratory frame having a flexible connection to said framework, springs remote from said connection and interposed between said vibratory frame and said stationary framework, a shaft carried by said frame over said location, a power driven vibratory motor connected to said frame to effect vibratory movement of said shaft in a plane normal to the undersides of said inverted pans, and a series of discs having eccentrically located holes and mounted on said shaft with the shaft extending through said holes whereby said discs depend from the shaft in a lower position and in such position strike the undersides of the pans at the lower end of the vibratory stroke of the shaft, said discs being turnable by the movement of the conveyor rods to positions where their centers are offset from said plane and the movement of the shaft effects essentially only oscillation of the discs about their centers, said discs being turnable on said shaft to return by gravity to said lower position to resume striking the underside of a pan when the rod moves from beneath the discs.

5. Vibratory means for freeing of sticking material the inverted pans of a conveyor as they pass over a given location, which conveyor includes a stationary framework and a series of rods for the support of the pans, said rods extending across the undersides of the pans and moving therewith, said means comprising a vibratory frame having a flexible connection to said framework, springs remote from said connection and interposed between said vibratory frame and said stationary framework, a shaft and a bar parallel to said shaft carried by said frame over said location, a power driven vibratory motor connected to said frame to effect vibratory movement of said said shaft and bar in a plane normal to the undersides of said inverted pans, and a series of discs having eccentrically located holes and mounted on said shaft with the shaft extending through said holes whereby said discs depend from the shaft in a lower position and are turnable to an upper position where they abut said bar, said discs in said lower position being disposed to strike the undersides of the pans at the lower end of the vibratory stroke of the shaft and being turnable by the movement of the conveyor rods to said upper position to allow the rods to pass beneath the discs, said discs being turnable on said shaft to return by gravity to said lower position to resume striking the underside of a pan when the rod moves from beneath the discs.

6. A vibratory rapper for cleaning an irregular but generally flat metal structure having width and length comprising a round, rigid bar extending said width and having a resilient support locating said bar a uniform distance above said structure, a series of metal discs having a radius greater than said distance and having eccentrically located holes larger than the cross-section of said bar, said bar extending through the holes of said discs whereby the discs generally depend therefrom, a vibratory motor connected to said bar to oscillate the same and said discs in a direction approximately normal to said structure, and means moving the structure lengthwise beneath the discs as the latter oscillate with the rod.

References Cited by the Examiner
UNITED STATES PATENTS
1,452,711   4/1923   Schroeder _____ 198—229 X SAMUEL F. COLEMAN, *Primary Examiner.*